United States Patent [19]

Haas

[11] 4,052,621

[45] Oct. 4, 1977

[54] OBJECT VIEWING SYSTEM WITH RADIATION RESPONSIVE SCREEN SYSTEM

[75] Inventor: David J. Haas, Stamford, Conn.

[73] Assignee: North American Philips Corporation, New York, N.Y.

[21] Appl. No.: 640,486

[22] Filed: Dec. 15, 1975

[51] Int. Cl.$^2$ .......................... F21K 2/02; G01T 1/20
[52] U.S. Cl. .................................. 250/458; 250/460; 250/487
[58] Field of Search ............... 250/458, 459, 460, 483, 250/485, 487

[56] References Cited

U.S. PATENT DOCUMENTS

| 3,344,276 | 9/1967 | Balding | 250/460 |
| 3,612,867 | 10/1971 | Rabodzei et al. | 250/485 |
| 3,838,273 | 9/1974 | Cusano | 250/483 X |

*Primary Examiner*—Archie R. Borchelt

*Attorney, Agent, or Firm*—Frank R. Trifari

[57] ABSTRACT

An object viewing system, comprising a radiation source, means for converting a radiation image to a light image, said means being spaced from said radiation source and comprising a phosphor layer and a light reflective layer, said phosphor layer being more proximate to said radiation source than said reflective layer and said reflective layer being disposed so as to reflect light from said phosphor layer in the direction of a radiation permeable light reflector, said radiation permeable light reflector being located between said converting means and said source, said reflector comprising a light reflecting area that faces and is angularly oriented with respect to said phosphor layer, and being disposed so as to receive light traveling in a first direction and reflecting said light in a second direction, said reflector being spaced from said radiation source such that said object can be located therebetween.

11 Claims, 2 Drawing Figures

OBJECT VIEWING SYSTEM WITH RADIATION RESPONSIVE SCREEN SYSTEM

BACKGROUND OF THE INVENTION

The present invention relates to an object viewing system, particularly to radiation-responsive screen system.

X-ray systems are known and used in the prior art for inspecting luggage or other containers for contraband or prohibited or undesirable contents. In general, one representative such system in the prior art consists of a so-called "back viewing" fluorescent screen system (which is explained below in conjunction with FIG. 1) but such back viewing systems generally suffer from the drawback of the attenuation by the screen of the image-bearing light, thereby requiring the system to be operated at a higher voltage level, (i.e., at a higher radiation intensity, which is not always desirable with x-rays) to provide an image of satisfactory light intensity.

The present invention overcomes this drawback and provides other advantages as well.

SUMMARY OF THE INVENTION

The present invention comprises an object viewing system that includes a radiation source and means for converting a radiation image (i.e., radiation embodying an image or other intelligence) to a light image, the means being spaced from the radiation source and comprising a phosphor layer and a light reflective layer, the former being disposed closer to the radiation source than the latter.

The system also comprises a radiation-permeable light reflector located between the radiation-converting means and the radiation source. The reflector includes a light reflecting areas facing the phosphor layer and angularly oriented therewith. The reflector is disposed to recieve light that travels in a first direction and reflect the light in a second direction. The reflector and radiation source are spaced apart so that the object that is to be viewed, can be located between them.

According to a preferred embodiment, the radiation-permeable light reflector comprises a layer of resinous material (e.g., an acrylic material, Mylar or cellophane) and a light reflecting layer, e.g., a metal layer.

PREFERRED EMBODIMENT

Figure 1:
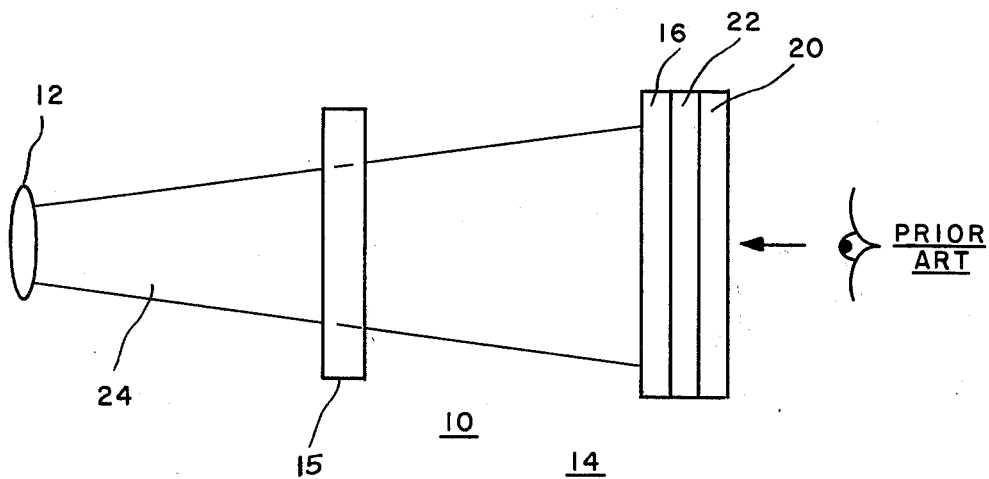
FIG. 1 is a schematic side view of a prior art viewing system.

Referring to FIG. 1, a radiation viewing system 10 known to the art has a radiation (i.e., x-ray or particle radiation) source 12 (e.g., an x-ray tube or radioactive material) and a fluorescent screen 14, with the object 15 that is to be inspected located therebetween. The fluorescent screen 14 includes a support 16 that faces the radiation source 12 and a phosphor layer 20 more removed from the radiation source 12, with a light opaque reflector or optical mirror 22 located therebetween. The fluorescent screen 14 can be a unitary structure with the phosphor layer 20, mirror 22 or light reflective coating, and support member 16 held together by a frame or other suitable means (not shown).

In the operation of the prior art system 10, the radiation 24 passes through the object 15 and impinges on the screen 14. In doing so the radiation passes through the support member 16 which can be of plastic or a cellulosic material, and the reflector 22, and reaches the phosphor layer 20, which it excites to produce light, which, preferably, is in the range visible with the naked eye. Because the radiation passes through the article or object 15 that is being observed or inspected (e.g., letters, luggage, packages, containers of various sorts, etc.), it is preferentially attenuated in accordance with non-uniformities in the radiation permeability of the object 15 that arise from different articles being located in the luggage or from mechanical or other nonuniformities existing in some object other than a container (e.g., a casting). Consequently, the radiation that completely passes through the object 15 embodies an image of the object in accordance with such attenuation, which image is translated to visible radiation by the screen 14.

However, because the radiation must, in the system 10, pass through the support member 16 and the reflector 22 before it reaches the phosphor layer 20, there is an undesirable further attenuation of the radiation, thus reducing the quantum of radiation reaching and exciting the phosphor layer 20 and leading to a less bright image being produced by the phosphor layer 20. In addition, more light is produced at the inside face of the phosphor 20 than at the outside (i.e., viewed) face because of the absorption of the x-ray by the phosphor itself. Such an undesirable result is substantially alleviated by the present invention, which is described hereinafter.

Figure 2:
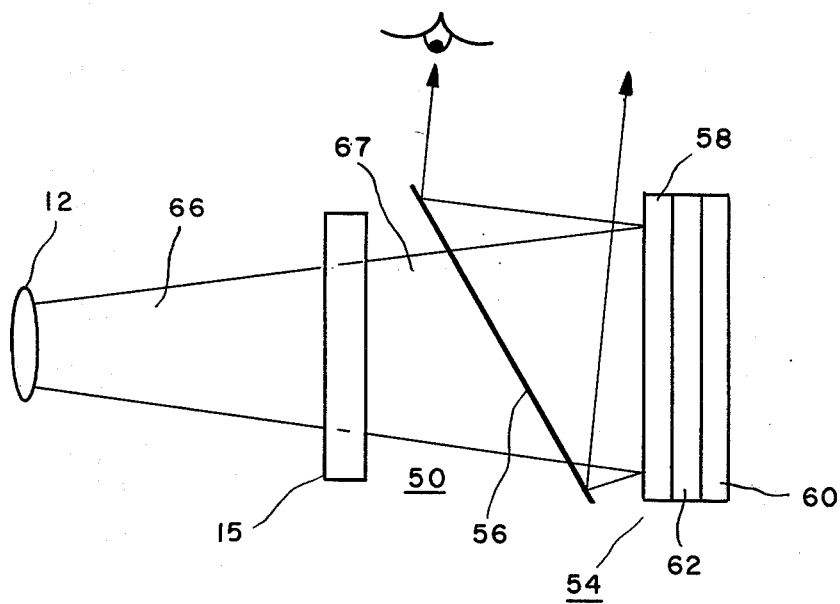
FIG. 2 is a schematic side view of the viewing system according to the present invention.

Referring to FIG. 2, the viewing system 50 of the present invention can be considered to be "front viewing" (where the side of the phosphor layer that faces the radiation source, or front, is observed, as compared with the "back viewing" system of FIG. 1, where the side of the phosphor layer that is more removed from the radiation source, or back, is viewed) and comprises a radiation source 12 (similar elements of FIGS. 1 and 2 being indicated by the same numerals), which can be an x-ray tube or other source of x-rays or particle radiation, and a viewing screen 54 that is spaced from the radiation source 12 to permit the object 15 that is to be viewed to be placed between them.

In contrast to the prior art system 10 (FIG. 1), the present invention comprises, further, a radiation permeable light reflector 56 that is located between the source 12 and the screen 54, more particularly, between the object 15 and the viewing screen 54, and, further, the viewing screen 54 of the present invention comprises a phosphor layer 58 that faces the radiation source 12 and the radiation permeable light reflector 56, and a support member 60 that is more removed from the radiation permeable light reflector 56, with an opaque light reflector or optical mirror 62 located between the phosphor layer 58 and the support member 60. The optical mirror 62 is adapted to reflect light generated by the phosphor layer 58, back toward the radiation permeable light reflector 56 (i.e., in the direction of the radiation source 12, contra the prior art system 10 of FIG. 1, where the light from the phosphor layer there is reflected by the mirror in the direction away from the radiation source 12).

The viewing screen 54 of the invention can have for the optical mirror 62, a metallized plastic film of, e.g., an acrylic or cellulosic material and the radiation-permeable light reflector 56 can be a metallized film of resinous material, e.g., a metallized (for instance, aluminized) film of an acrylic, Mylar, or polyethylene. The radiation-permeable light reflector 56 is arranged so as to receive light from the viewing screen 54 and reflect it toward the observer.

In the operation of the invention system 50, the radiation 66 from the source 12 passes through the object 15 (which can be a container or non-container) and is preferentially attenuated in accordance with the non-uniformity of radiation permeability of the object, as described above. The radiation 67 passing through the object and carrying the image then passes through the radiation permeable light reflector 56 and strikes the phosphor layer 58, which it excites to produce a light image embodying the image of the object or other intelligence. The light from the phosphor directed toward the optical mirror 62 is reflected by the latter toward the radiation permeable light reflector 56, by which it is reflected toward the observer.

Even though the radiation permeable light reflector 56 might not be totally permeable to the radiation 67 passing through the object, the attenuation of the radiation by the radiation-permeable reflector 56 is less than the attenuation thereof by the support member 16 and optical mirror 22 of the prior art system 10 (FIG. 1) so that there is a significant net gain in the light produced and in the brightness of the image reaching the observer particularly from low-energy x-ray sources. The gain in image brightness is further promoted by the fact that, whereas in the prior art system (FIG. 1) the light image produced by excitation of the phosphor was required to pass through the phosphor layer 20 to reach the observer so that there was an attenuation of the image brightness by the phosphor layer, the present invention permits the light produced at the phosphor layer (58) portions closer to the radiation source 12 to reach the radiation-permeable reflector 56 without passing through the phosphor layer 58, thus alleviating the brightness attenuation to a significant degree.

Aside from the increased light output and reduced attenuation afforded by the present invention, another advantage thereof is that a more compact optical system is achievable, this by reason of the fact that the mirror is placed in front of the fluorescent screen rather than behind it for viewing at right angles to the x-ray beam.

Where the radiation-permeable reflector (which can be planar or curved) of the present system is of, e.g., aluminized Mylar, the aluminum layer can have a thickness can be about $1. \times 10^{-3}$ to $1. \times 10^{-6mm}$ and the Mylar film thickness can be about 0.001 to $0.01^{mm}$ when the radiation is produced from a source operated in the range of, for example, about 10Kev to about 150Kev, whereby the radiation permeable reflector will transmit about 90 to 99.5% of the incident beam. In general, a thinner (i.e., more permeable) reflector 56 should be used with a lower energy transmitted radiation 67.

When it is desired, the screen 54 can contain an aperture and the system 50 can include a Schmidt optics system adjacent the phosphor layer 58, so that the light image on the phosphor screen is observable with the Schmidt optics via the aperture. Also, the abovementioned materials (or, in fact, other materials exhibiting high radiation permeability) can be used interchangeably for the support layer 60 and the reflector 56. Further, where it is desired, the support layer 60 can be of a radiation shielding material (e.g., lead) to prevent exposure of personnel. This is not possible with the real viewing system unless there are employed costly optically transparent materials like lead glass.

I claim:
1. An object viewing system, comprising:
   a. a radiation source;
   b. means for converting a radiation image to a light image, said means being spaced from said radiation source and comprising a fluorescent layer and a light reflective layer, said fluorescent layer being more proximate to said radiation source than said reflective layer and said reflective layer being disposed so as to reflect light from said fluorescent layer in the direction of a radiation permeable light reflector; and
   c. said radiation permeable light reflector located between said converting means and said source, said reflector comprising a light reflecting area that faces said fluorescent layer and being disposed so as to receive light from said converting means and reflecting said light toward an observer, said reflector being spaced from said radiation source such that said object can be located therebetween.

2. A viewing system as in claim 1, wherein said converting means further comprises a support structure that is disposed at the side of said reflective layer more removed from said radiation source.

3. A viewing system as in claim 2, wherein said support structure is of a substantially radiation impermeable material.

4. A viewing system as in claim 1, wherein said radiation permeable light reflector comprises a layer of resinuous or cellulosic material and a metal layer located thereon, said metal layer comprising said reflecting area.

5. A viewing system as in claim 4, wherein said metal layer is of aluminum.

6. A viewing system as in claim 1, wherein said fluorescent layer comprises a phosphor material.

7. A viewing system as in claim 1, wherein said reflector is angularly oriented with respect to said fluorescent layer.

8. A viewing system as in claim 1, wherein said reflector is disposed so as to receive said light traveling in a first direction from said fluorescent layer and reflecting said light in a second direction.

9. A viewing system as in claim 1, wherein said light reflective layer is disposed so as to reflect light from said fluorescent layer in the general direction of said radiation source.

10. A viewing system as in claim 1, wherein said substantially radiation permeable reflector comprises a layer of material selected from the group essentially consisting of a resinous material and a cellulosic material.

11. An object viewing system, comprising:
   a. a radiation source;
   b. means for converting a radiation image to a light image, said means being spaced from said radiation source and comprising a fluorescent layer disposed adjacent to said radiation source; and
   c. a substantially radiation permeable light reflector located between said converting means and said source, said reflector being disposed so as to recieve light from said fluorescent layer and reflecting said received light to an observation point, said reflector being spaced from said radiation source such that said object can be located therebetween.

* * * * *